United States Patent
Pan et al.

(10) Patent No.: US 9,524,738 B1
(45) Date of Patent: Dec. 20, 2016

(54) DISK DRIVE HEAD GIMBAL ASSEMBLY HAVING A FLEXURE TAIL WITH A DIELECTRIC LAYER THAT HAS REGIONS OF LESSER THICKNESS

(71) Applicant: Western Digital Technologies, Inc., Irvine, CA (US)

(72) Inventors: Tzong-Shii Pan, San Jose, CA (US); Yih-Jen Dennis Chen, Pleasanton, CA (US); Wing Chun Shum, San Jose, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 14/749,910

(22) Filed: Jun. 25, 2015

(51) Int. Cl.
*G11B 5/48* (2006.01)

(52) U.S. Cl.
CPC ............... *G11B 5/48* (2013.01); *G11B 5/4846* (2013.01); *G11B 5/4853* (2013.01); *G11B 5/4833* (2013.01)

(58) Field of Classification Search
None
See application file for complete search history.

(56) References Cited

U.S. PATENT DOCUMENTS

| | | |
|---|---|---|
| 5,235,482 A | 8/1993 | Schmitz |
| 5,861,661 A | 1/1999 | Tang et al. |
| 5,903,056 A | 5/1999 | Canning et al. |
| 6,046,889 A | 4/2000 | Berding et al. |
| 6,052,890 A | 4/2000 | Malagrino, Jr. et al. |
| 6,061,206 A | 5/2000 | Foisy et al. |
| 6,101,876 A | 8/2000 | Brooks et al. |
| 6,147,831 A | 11/2000 | Kennedy et al. |
| 6,151,189 A | 11/2000 | Brooks |
| 6,151,197 A | 11/2000 | Larson et al. |
| 6,185,067 B1 | 2/2001 | Chamberlain |
| 6,185,074 B1 | 2/2001 | Wang et al. |
| 6,208,486 B1 | 3/2001 | Gustafson et al. |
| 6,215,616 B1 | 4/2001 | Phan et al. |
| 6,228,689 B1 | 5/2001 | Liu |
| 6,272,694 B1 | 8/2001 | Knoth |
| 6,288,866 B1 | 9/2001 | Butler et al. |
| 6,292,333 B1 | 9/2001 | Blumentritt et al. |
| 6,344,950 B1 | 2/2002 | Watson et al. |
| 6,349,464 B1 | 2/2002 | Codilian et al. |
| 6,388,873 B1 | 5/2002 | Brooks et al. |
| 6,417,979 B1 | 7/2002 | Patton, III et al. |

(Continued)

*Primary Examiner* — Carlos E Garcia (57) ABSTRACT

A flexure tail of a head suspension assembly includes a structural layer, a conductive layer, a dielectric layer between the structural and conductive layers, and an insulative cover layer disposed on the conductive layer. The conductive layer includes a plurality of flexure bond pads in a terminal region of the flexure tail. The insulative cover layer includes a plurality of openings that expose each of the plurality of flexure bond pads. The dielectric layer defines a first thickness between the structural layer and the conductive layer at each of the plurality of flexure bond pads. The dielectric layer also defines a second thickness between the structural layer and the conductive layer adjacent to the plurality of flexure bond pads in the terminal region of the flexure tail. The second thickness is less than the first thickness by a thickness difference that is no less than a cover layer thickness.

20 Claims, 5 Drawing Sheets

FIG. 5

(56) References Cited

U.S. PATENT DOCUMENTS

| | | |
|---|---|---|
| 6,421,208 B1 | 7/2002 | Oveyssi |
| 6,441,998 B1 | 8/2002 | Abrahamson |
| 6,462,914 B1 | 10/2002 | Oveyssi et al. |
| 6,466,398 B1 | 10/2002 | Butler et al. |
| 6,469,871 B1 | 10/2002 | Wang |
| 6,502,300 B1 | 1/2003 | Casey et al. |
| 6,519,116 B1 | 2/2003 | Lin et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,545,382 B1 | 4/2003 | Bennett |
| 6,549,381 B1 | 4/2003 | Watson |
| 6,560,065 B1 | 5/2003 | Yang et al. |
| 6,571,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,656,772 B2 | 12/2003 | Huang |
| 6,657,811 B1 | 12/2003 | Codilian |
| 6,661,597 B1 | 12/2003 | Codilian et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,703,566 B1 | 3/2004 | Shiraishi et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,884,313 B2 | 4/2005 | Liu et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,142,395 B2 * | 11/2006 | Swanson ............... G11B 5/484 360/244.3 |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,205,484 B2 | 4/2007 | Shiraishi et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et al. |
| 7,215,513 B1 | 5/2007 | Chang et al. |
| 7,215,514 B1 | 5/2007 | Yang et al. |
| 7,224,551 B1 | 5/2007 | Ou-Yang et al. |

(56) References Cited

U.S. PATENT DOCUMENTS

| | | |
|---|---|---|
| D543,981 S | 6/2007 | Diebel |
| 7,227,725 B1 | 6/2007 | Chang et al. |
| 7,239,475 B1 | 7/2007 | Lin et al. |
| 7,245,458 B2 | 7/2007 | Zhang et al. |
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |
| 7,298,584 B1 | 11/2007 | Yamada et al. |
| 7,298,593 B2 | 11/2007 | Yao et al. |
| 7,327,537 B1 | 2/2008 | Oveyssi |
| 7,339,268 B1 | 3/2008 | Ho et al. |
| 7,342,746 B1 | 3/2008 | Lin |
| RE40,203 E | 4/2008 | Hatch et al. |
| 7,353,524 B1 | 4/2008 | Lin et al. |
| 7,359,154 B2 | 4/2008 | Yao et al. |
| 7,369,368 B1 | 5/2008 | Mohajerani |
| 7,372,670 B1 | 5/2008 | Oveyssi |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |
| 7,394,139 B2 | 7/2008 | Park et al. |
| 7,414,814 B1 | 8/2008 | Pan |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,463,453 B2 | 12/2008 | Zhou et al. |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,505,231 B1 | 3/2009 | Golgolab et al. |
| 7,515,240 B2 | 4/2009 | Lu et al. |
| 7,525,769 B2 | 4/2009 | Yao et al. |
| 7,529,064 B1 | 5/2009 | Huang et al. |
| 7,538,981 B1 | 5/2009 | Pan |
| 7,561,374 B1 | 7/2009 | Codilian et al. |
| 7,567,410 B1 | 7/2009 | Zhang et al. |
| 7,576,955 B1 | 8/2009 | Yang et al. |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,672,083 B1 | 3/2010 | Yu et al. |
| 7,684,155 B1 | 3/2010 | Huang et al. |
| 7,686,555 B1 | 3/2010 | Larson et al. |
| 7,697,102 B2 | 4/2010 | Hirakata et al. |
| 7,709,078 B1 | 5/2010 | Sevier et al. |
| 7,715,149 B1 | 5/2010 | Liebman et al. |
| 7,729,091 B1 | 6/2010 | Huang et al. |
| 7,733,607 B2 | 6/2010 | Yao et al. |
| 7,751,145 B1 | 7/2010 | Lin et al. |
| 7,826,177 B1 | 11/2010 | Zhang et al. |
| 7,852,601 B1 | 12/2010 | Little |
| 7,864,488 B1 | 1/2011 | Pan |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,116,038 B1 | 2/2012 | Zhang et al. |
| 8,125,740 B1 | 2/2012 | Yang et al. |
| 8,142,671 B1 | 3/2012 | Pan |
| 8,156,633 B1 | 4/2012 | Foisy |
| 8,159,785 B1 | 4/2012 | Lee et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,295,014 B1 | 10/2012 | Teo et al. |
| 8,300,352 B1 | 10/2012 | Larson et al. |
| 8,305,708 B2 | 11/2012 | Tacklind |
| 8,320,084 B1 | 11/2012 | Shum et al. |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,411,389 B1 | 4/2013 | Tian et al. |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,459 B1 | 7/2013 | Pan |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 | 10/2013 | Foisy et al. |
| 8,553,356 B1 | 10/2013 | Heo et al. |
| 8,553,366 B1 | 10/2013 | Hanke |
| 8,553,367 B1 | 10/2013 | Foisy et al. |
| 8,616,900 B1 | 12/2013 | Lion |
| 8,665,555 B1 | 3/2014 | Young et al. |
| 8,665,566 B1 | 3/2014 | Pan et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,812 B1 | 6/2014 | Chen et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |

(56) References Cited

U.S. PATENT DOCUMENTS

| | | |
|---|---|---|
| 8,792,205 B1 | 7/2014 | Boye-Doe et al. |
| 8,797,677 B2 | 8/2014 | Heo et al. |
| 8,797,689 B1 | 8/2014 | Pan et al. |
| 8,824,095 B1 | 9/2014 | Dougherty |
| 8,824,098 B1 | 9/2014 | Huang et al. |
| 2005/0243472 A1 | 11/2005 | Kamigama et al. |
| 2006/0098347 A1 | 5/2006 | Yao et al. |
| 2006/0146262 A1 | 7/2006 | Yu et al. |
| 2006/0157869 A1 | 7/2006 | Huang et al. |
| 2007/0246251 A1 | 10/2007 | Shiraishi et al. |
| 2008/0002303 A1 | 1/2008 | Wang et al. |
| 2008/0068757 A1 | 3/2008 | Kamigama et al. |
| 2009/0151994 A1 * | 6/2009 | Ohsawa ............ G11B 5/486 174/261 |
| 2009/0253233 A1 | 10/2009 | Chang et al. |
| 2011/0212281 A1 | 9/2011 | Jacoby et al. |
| 2012/0193127 A1 * | 8/2012 | Ishigaki ............ G11B 5/4846 174/251 |
| 2013/0038964 A1 | 2/2013 | Garbarino et al. |
| 2013/0091698 A1 | 4/2013 | Banshak, Jr. et al. |
| 2013/0155546 A1 | 6/2013 | Heo et al. |
| 2013/0290988 A1 | 10/2013 | Watson et al. |

\* cited by examiner

DISK DRIVE HEAD GIMBAL ASSEMBLY HAVING A FLEXURE TAIL WITH A DIELECTRIC LAYER THAT HAS REGIONS OF LESSER THICKNESS

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For convenience, all heads that can read may be referred to as "read heads" herein, regardless of other devices and functions the read head may also perform (e.g. writing, micro-actuation, flying height control, touch down detection, lapping control, etc). A contemporary trend is to include more devices in and on the head, which may facilitate reading and writing (for example, a heater to reduce head-disk spacing during reading or writing), and/or perform other functions such as microactuation or lapping control. As more devices are included in and on the head, the number of electrical connections to the head must increase. Hence there is a need in the art for methods and structures to facilitate or accommodate an increased number of electrical connections to a head in an information storage device.

In a modern magnetic hard disk drive device, each head is a sub-component of a head-gimbal assembly (HGA) that typically includes a suspension assembly with a laminated flexure to carry the electrical signals to and from the head. The HGA, in turn, is a sub-component of a head-stack assembly (HSA) that typically includes a plurality of HGAs, an actuator, and a flexible printed circuit (FPC). The plurality of HGAs are attached to various arms of the actuator.

Modern laminated flexures typically include conductive copper traces that are isolated from a stainless steel structural layer by a polyimide dielectric layer. So that the signals from/to the head can reach the FPC on the actuator body, each HGA flexure includes a flexure tail that extends away from the head along a corresponding actuator arm and ultimately attaches to the FPC adjacent the actuator body. That is, the flexure includes traces that extend from adjacent the head and continue along the flexure tail to electrical connection points. The FPC includes conductive electrical terminals that correspond to the electrical connection points of the flexure tail.

To facilitate electrical connection of the conductive traces of the flexure tails to the conductive electrical terminals of the FPC during the HSA manufacturing process, the flexure tails must first be properly positioned relative to the FPC so that the conductive traces of the flexure tails are aligned with the conductive electrical terminals of the FPC. Then the flexure tails must be held or constrained against the conductive electrical terminals of the FPC while the aforementioned electrical connections are made (e.g. by ultrasonic bonding, solder jet bonding, or solder bump reflow).

However, recently for some disk drive products, the aforementioned electrical connections may employ a type of anisotropic conductive film (ACF) bonding. An anisotropic conductive film is typically an adhesive doped with conductive beads or cylindrical particles of uniform or similar diameter. As the doped adhesive is compressed and cured, it is squeezed between the surfaces to be bonded with sufficient uniform pressure that a single layer of the conductive beads may make contact with both surfaces to be bonded. In this way, the thickness of the adhesive layer between the bonded surfaces may become approximately equal to the size of the compressed conductive beads. The cured adhesive film may conduct electricity via the contacting beads in a direction normal to the bonded surfaces (though may not necessarily conduct electricity parallel to the bonded surfaces, since the beads may not touch each other laterally—though axially each bead is forced to contact both of the surfaces to be bonded—hence the term "anisotropic").

Maintaining sufficient uniform pressure during adhesive curing, such that a single layer of conductive beads in an ACF makes contact with both opposing surfaces to be bonded, may be achievable for existing HGA designs using a patterned thermode tool that is aligned to press only upon bond pad locations. However, in a high-volume manufacturing environment like that necessitated by the very competitive information storage device industry, there is a practical requirement for fast, cost-effective, and robust bonding of many bond pads simultaneously, without the need for precise alignment of the thermode tool. Hence, there is a need in the art for a flexure tail design that can receive pressure only at the bond pad locations from a non-patterned thermode tool that does not need to be precisely aligned.

Some previously disclosed designs have included discontinuous islands in the structural layer of the flexure tail, to facilitate simultaneous ACF bonding of many bond pads simultaneously by a non-patterned thermode tool. However, such discontinuous islands can be disadvantageous in the event that rework of the flexure tail bonding process becomes necessary. Specifically, if a flexure tail needs to be removed after bonding to the FPC, a flexure tail weakness due to the discontinuous nature of the structural layer islands may encourage the flexure tail to tear, rather than to peel away thoroughly from the FPC. Such tearing may result in a portion of the unwanted flexure tail to remain bonded to the FPC, which may then interfere with the adhesion and the proper electrical connection of a replacement flexure tail to be bonded to the same portion of the FPC.

Accordingly, there is a need in the art for an improved flexure tail design that facilitates the use of a non-patterned thermode tool to simultaneously apply an acceptably uniform pressure to a group of bond pads during HSA manufacture (e.g. during an ACF bonding process), and that has an enhanced peel strength for possible HSA rework.

DESCRIPTION OF EXAMPLE EMBODIMENTS

Figure 1:
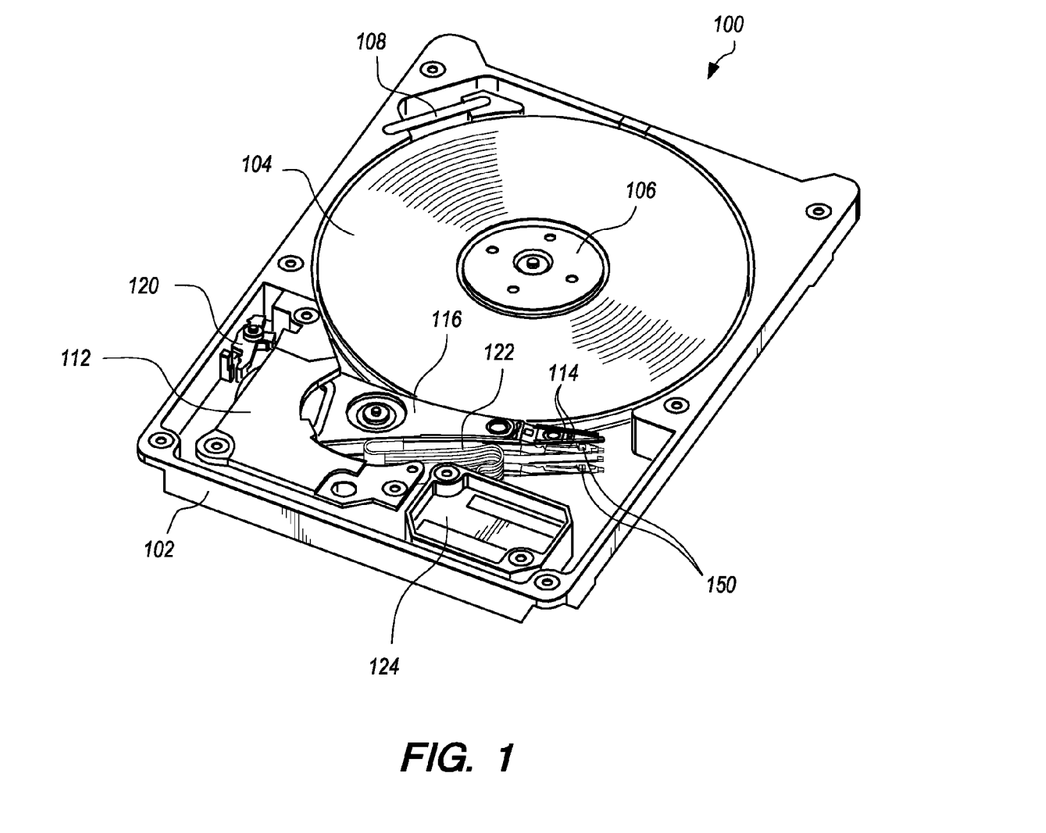
FIG. 1 is a top perspective view of a disk drive capable of including an embodiment of the present invention.

FIG. 1 is a top perspective view of a disk drive 100 capable of including an embodiment of the present invention. The disk drive 100 includes a disk drive base 102 and two annular magnetic disks 104. The disk drive 100 further includes a spindle 106, rotatably mounted on the disk drive base 102, for rotating the disks 104. The rotation of the disks 104 establishes air flow through recirculation filter 108. In other embodiments, disk drive 100 may have only a single disk, or alternatively, more than two disks.

The disk drive 100 further includes an actuator 116 that is rotatably mounted on disk drive base 102. Voice coil motor 112 rotates the actuator 116 through a limited angular range so that at least one head gimbal assembly (HGA) 114 is desirably positioned relative to one or more tracks of information on a corresponding one of the disks 104. In the embodiment of FIG. 1, the actuator 116 includes three arms upon which four HGAs 114 are attached, each corresponding to a surface of one of the two disks 104. However in other embodiments fewer or more HGAs 114 may be included depending on the number of disks 104 that are included and whether the disk drive 100 is depopulated. Each HGA 114 includes a head 150 for reading and writing data from and to one of the disks 104. The actuator 116 may occasionally be latched at an extreme angular position within the limited angular range, by latch 120. Electrical signals to/from the HGAs 114 are carried to other drive electronics via a flexible printed circuit that includes a flex cable 122 (preferably including a preamplifier circuit) and flex cable bracket 124.

Figure 2:
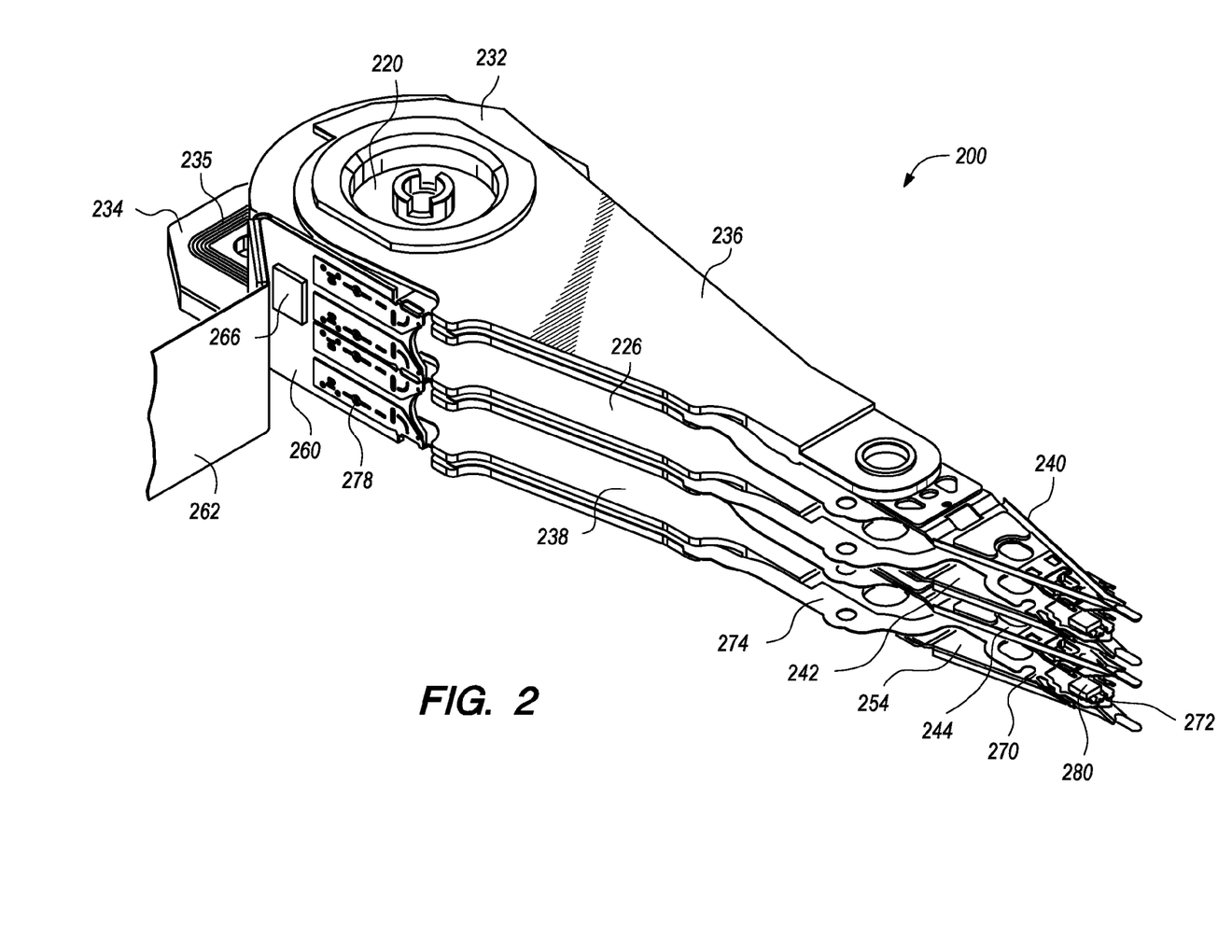
FIG. 2 is a perspective view of a head stack assembly (HSA) according to an embodiment of the present invention.

FIG. 2 is a perspective view of a head stack assembly (HSA) 200 capable of including an embodiment of the present invention. The HSA 200 includes an actuator body 232 and a plurality of actuator arms 226, 236, 238 extending from the actuator body 232. The actuator body 232 includes a pivot bearing cartridge 220 disposed in the actuator bore, and a coil support 234 that supports a coil 235 and extends from the actuator body 232 in a direction that is generally opposite the actuator arms 226, 236, 238. The HSA 200 also includes a plurality of head gimbal assemblies (HGA) 240, 242, 244, 254, attached to the actuator arms 226, 236, 238. For example, such attachment may be made by swaging. Note that the inner actuator arm 226 includes two HGAs, while each of the outer actuator arms 236, 238, includes only one HGA. This is because in a fully populated disk drive the inner arms are positioned between disk surfaces while the outer actuator arms are positioned over (or under) a single disk surface. In a depopulated disk drive, however, any of the actuator arms may have one or zero HGAs, possibly replaced by a dummy mass.

Each HGA includes a head for reading and/or writing to an adjacent disk surface (e.g. HGA 254 includes head 280). The head 280 is attached to a tongue portion 272 of a laminated flexure 270. The laminated flexure 270 is part of the HGA 254, and is attached to a load beam (the part of the HGA 254 to which the numerical label 254 points). The laminated flexure 270 may include a structural layer (e.g. stainless steel), a dielectric layer (e.g. polyimide), and a conductive layer into which traces are patterned (e.g. copper). In certain embodiments, the load beam comprises stainless steel preferably having a thickness greater than that of the structural layer of the laminated flexure 270.

In the embodiment of FIG. 2, the HSA 200 also includes a flexible printed circuit (FPC) 260 adjacent the actuator body 232. The FPC 260 includes a flex cable 262 and a preamplifier 266. The FPC 260 may comprise a laminate that includes two or more conventional dielectric and conductive layer materials (e.g. one or more polymeric materials, copper, etc.). The laminated flexure 270 includes a flexure tail 274 that runs along the actuator arm 238 to a terminal region 278 of the laminated flexure 270 that is electrically connected to bond pads of the FPC 260.

Methods of electrical connection of the flexure tails (e.g. flexure tail 274) to the FPC 260 include ultrasonic bonding of gold coatings thereon, solder reflow, solder ball jet (SBJ), and anisotropic conductive film (ACF) bonding, and are preferably but not necessarily automated. To electrically connect and securely attach the flexure tails to the FPC 260, the flexure tails are first aligned with the FPC 260, and then pressed against the FPC 260 (at least temporarily) while electrical connection is established and secure attachment is completed. Maintaining alignment and sufficient uniform pressure and temperature to groups of bond pads may be desirable during this process, and may be facilitated by certain inventive structural features in the terminal regions of the flexure tails.

Figure 3:
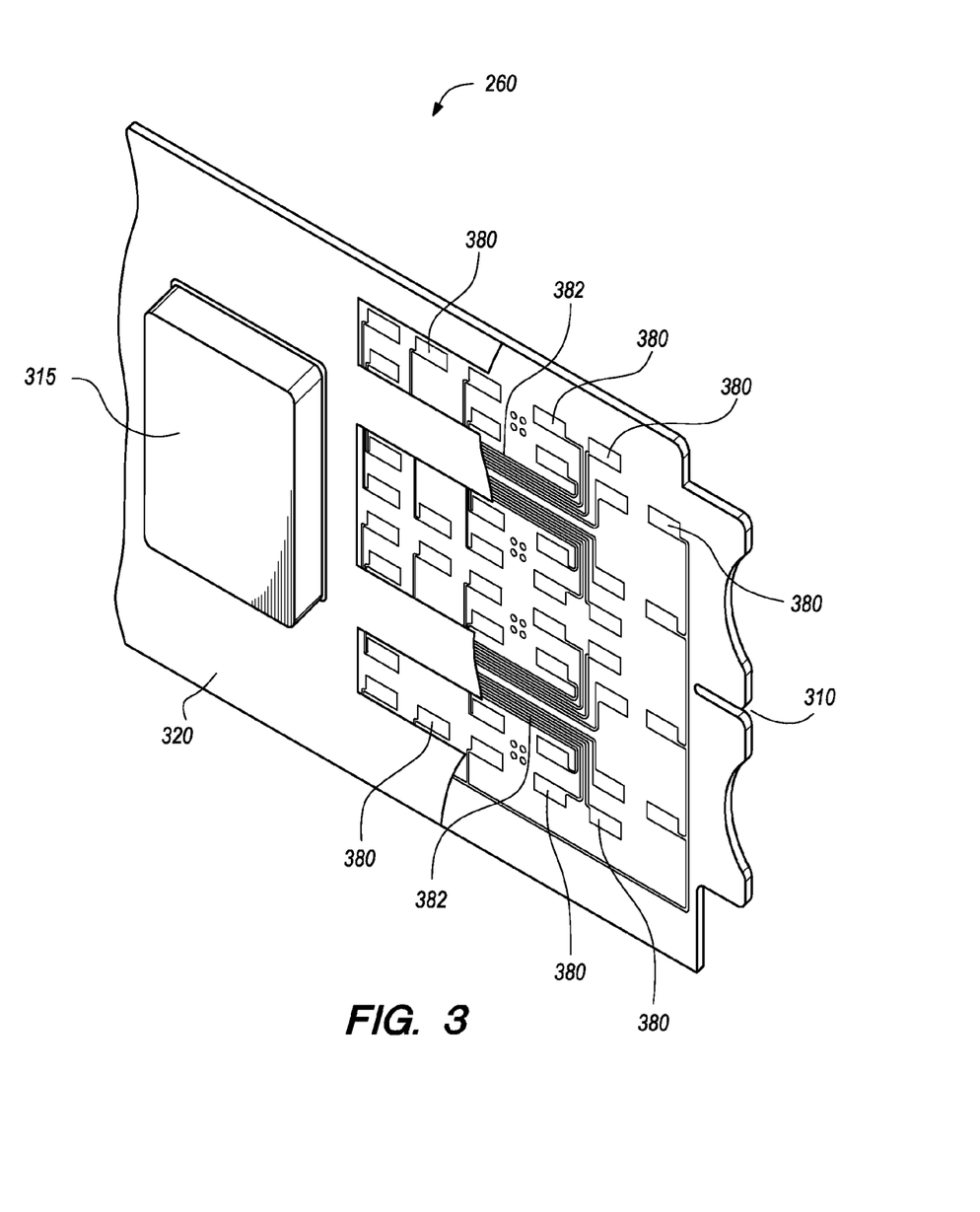
FIG. 3 is a perspective view of a portion of a flexible printed circuit (FPC) according to an embodiment of the present invention.

FIG. 3 depicts the FPC 260 before flexure tail terminal regions (i.e. the portion of each flexure tail that overlaps the FPC, for example, flexure tail terminal region 278) are bonded thereto. The FPC 260 includes electrical conduits 382 that terminate at FPC bond pads 380, which are aligned with and connected to flexure bond pads of the terminal regions (e.g. flexure tail terminal region 278) of the HGA flexure tails. The FPC electrical conduits 382 may connect to a pre-amplifier chip 315 (shown exploded from the FPC 260 in FIG. 3). Two of the HGA flexure tails may pass through the FPC slit 310 to help facilitate their support and alignment.

The FPC 260 may include an optional insulative cover layer 320 having windows exposing the regions where the flexure tail terminal regions and the pre-amplifier chip 315 are bonded thereto. The cover layer 320 is shown cut away in the view of FIG. 3, so that the electrical conduits 382 can be better depicted.

Figure 4A:
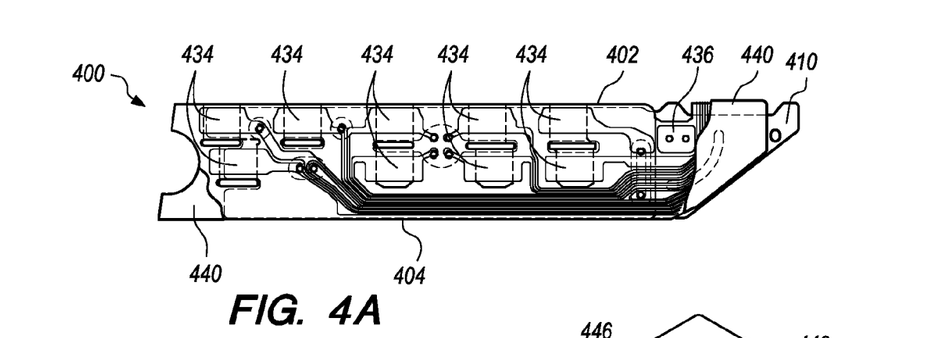
FIG. 4A is an assembled plan view of a flexure tail terminal region, according to an embodiment of the present invention.
Figure 4B:
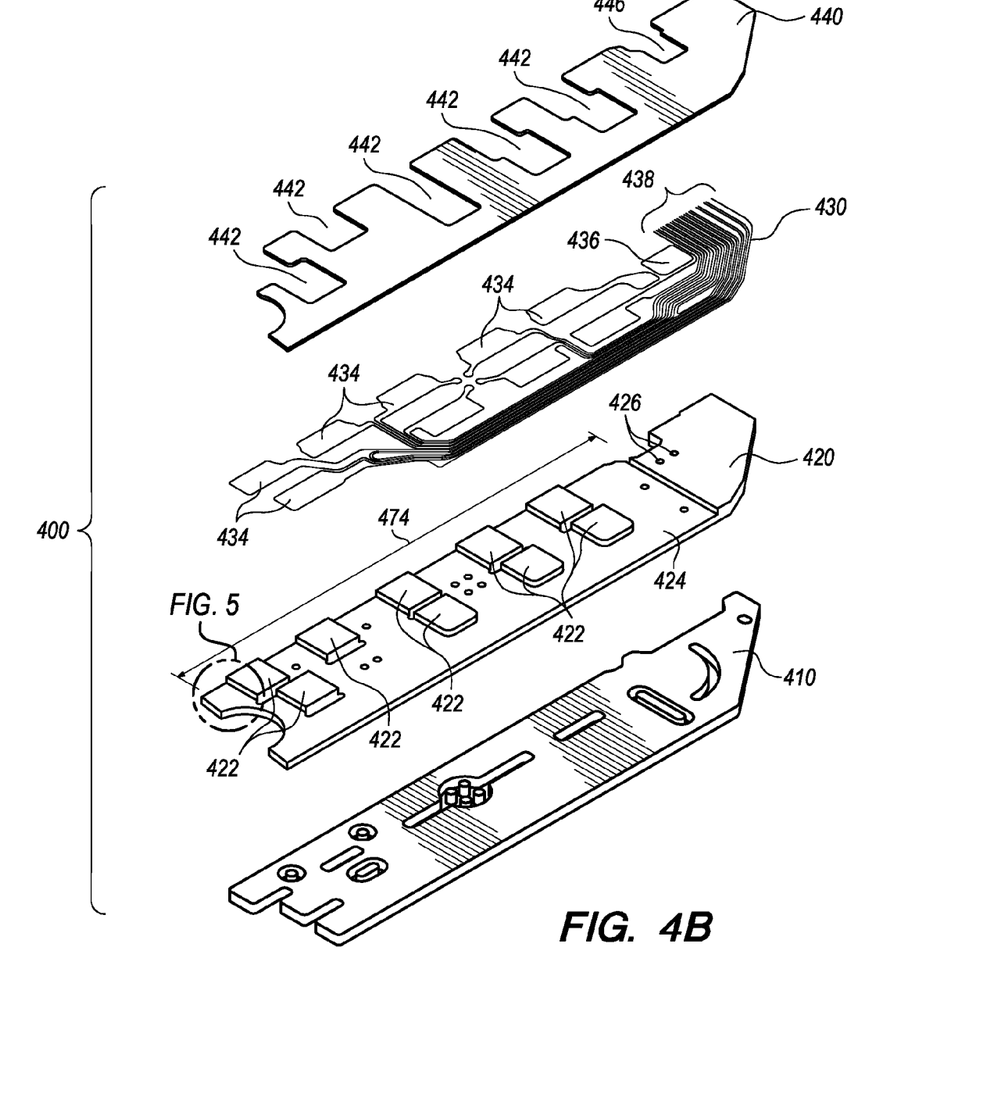
FIG. 4B is an exploded perspective view of the flexure tail terminal region of FIG. 4A.

FIG. 4A is an assembled plan view of a flexure tail terminal region 400, according to an embodiment of the present invention. FIG. 4B is an exploded perspective view of the flexure tail terminal region 400. Now referring to FIGS. 4A and 4B, the flexure tail terminal region 400 includes a structural layer 410 (e.g. stainless steel), a conductive layer 430 (e.g. copper), and a dielectric layer 420 (e.g. polyimide) between the structural layer 410 and the conductive layer 430. The flexure tail terminal region 400 may include first and second longitudinal edges 402, 404.

In the embodiment of FIGS. 4A and 4B, the flexure tail terminal region 400 also includes a cover layer 440 disposed on the conductive layer 430, that comprises an electrically insulative material (e.g. an insulative polymer). In certain embodiments, the thickness of the insulative cover may preferably be in the range of 3 microns to 5 microns. In the embodiment of FIGS. 4A and 4B, the insulative cover layer includes a plurality of openings 442 that expose each of the plurality of flexure bond pads 434 in the flexure tail terminal region 400.

In the embodiment of FIGS. 4A and 4B, the conductive layer 430 of the flexure tail terminal region 400 includes a plurality of flexure bond pads 434 that are aligned with corresponding ones of a plurality of FPC bond pads (e.g. FPC bond pads 380 of FIG. 3). Preferably, each of the plurality of flexure bond pads 434 may comprise a widened region of one of a plurality of electrically conductive traces 438 in the conductive layer 430. In certain alternative embodiments, additional flexure bond pads might be present that do not have the characteristics of the flexure bond pads 434, but in that case the "plurality" under consideration could exclude such flexure bond pads. Hence, any two or more flexure bond pads can be considered a "plurality of flexure bond pads" herein. In certain embodiments, each of the flexure bond pads 434 may preferably be bonded to a corresponding one of the plurality of FPC bond pads 380 (shown in FIG. 3) by an anisotropic conductive film.

In certain embodiments, the flexure tail terminal region 400 defines a flexure tail longitudinal axis (any axis parallel to the longitudinal edges 402, 404), and each of the plurality of flexure bond pads 434 may optionally extend further parallel to the flexure tail longitudinal axis than it extends transverse to the flexure tail longitudinal axis. In certain embodiments, such a geometry (i.e. longitudinally dominant aspect ratio) of the flexure bond pads 434 may advantageously allow a larger flexure bond pad area considering size constraints imposed by the HSA assembly, or better accommodate an expected relative alignment uncertainty between the flexure tail terminal region 400 and the FPC 260 (shown in FIG. 3) during the assembly process.

As shown in FIGS. 4A and 4B, the conductive layer 430 may also include an optional ground pad 436, which may be electrically grounded to the underlying structural layer 410 by optional electrically conductive vias 426 that pass through the dielectric layer 420. The ground pad 436 is preferably exposed by a window 446 through the insulative cover layer 440.

Figure 5:
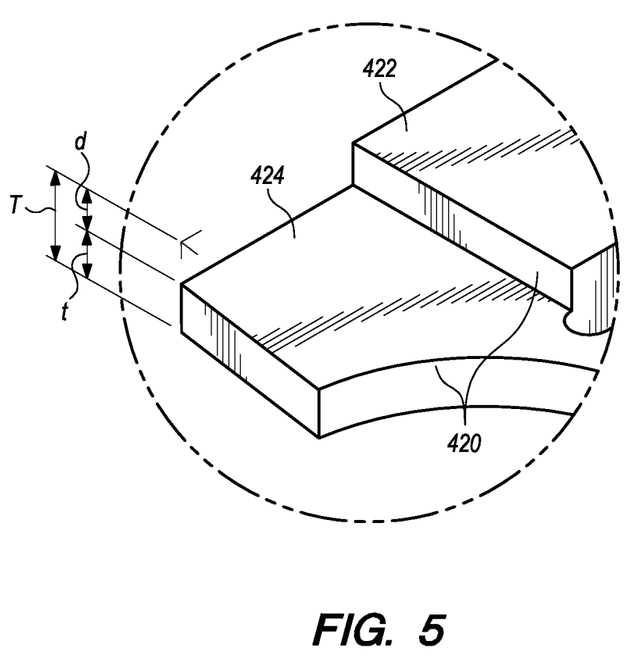
FIG. 5 is an expanded view of a stepped area of a dielectric layer of a flexure tail terminal region according to an embodiment of the present invention.

FIG. 5 is an expanded view of a stepped area (indicated by the labeled and dashed circle shown in FIG. 4B) of the dielectric layer 420 of the flexure tail terminal region 400. Now referring additionally to FIG. 5, the dielectric layer 420 defines a first thickness T between the structural layer 410 and the conductive layer 430 at each of the plurality of flexure bond pads 434. For example, in the embodiment of FIGS. 4A, 4B, and 5, the dielectric layer 420 has thickness T in regions 422 that are preferably aligned with the flexure tail bond pads 434. In certain embodiments, the first thickness T may preferably be in the range of 7 microns to 11 microns.

Still referring to FIGS. 4A, 4B, and 5, the dielectric layer 420 defines a second thickness t between the structural layer 410 and the conductive layer 430 in the area 424 that is adjacent to, surrounding, or partially surrounding one or more of the plurality of flexure bond pads 434 in the flexure tail terminal region 400. In the embodiment of FIGS. 4A, 4B, and 5, the second thickness t is less than the first thickness T by a thickness difference d that is preferably no less than the thickness of the cover layer 440.

In certain embodiments, the foregoing inequality, together with the alignment of the thicker regions 422 over the flexure tail bond pads 434, may advantageously help to transfer heat and pressure from a flat (i.e. non-patterned) thermode tool to the plurality of bond pads 434 simultaneously, for example during ACF bonding (and to help facilitate ACF bonding). In certain embodiments, a flat (i.e. non-patterned) thermode tool may simplify and quicken the ACF bonding of the flexure tail bond pads 434, by reducing the need for precise alignment of the thermode tool during use.

The dielectric layer 420 may be fabricated to have the thickness T in the regions 422 and the lesser thickness t in the area 424 by several alternative methods. For example, the area 424 may be partial etched to the lesser thickness t, by a wet etching process that is not the same as or simultaneous with the etching process used to etch vias, holes, or slots all the way through the dielectric layer 420. Alternatively, a single etching process (e.g. oxygen plasma etching) may be used to thin the area 424 to the lesser thickness t, and also to create any necessary through openings in the dielectric layer 420. The different thickness results from such a single etching process may be based on opaque, transparent, versus translucent mask features, sacrificial mask thickness differences, or etching time differences. Alternatively, an additive process may be used to fabricate the dielectric layer 420, in which a patterned polyimide sub-laminate film having a thickness that is approximately the same as thickness difference d, may be laminated to an underlying polyimide sub-laminate film having thickness t.

In the embodiment of FIGS. 4A, 4B, and 5, the thickness difference d between regions of the dielectric layer 420 causes a total thickness of the flexure tail terminal region 400 to be greater at each of the plurality of flexure bond pads 434 than adjacent to the plurality of flexure bond pads 434 (e.g. in the area 424). In certain embodiments, the thickness difference d may preferably be in the range of 4 microns to 8 microns. In certain embodiments, the first thickness T may preferably be approximately twice the second thickness t.

In certain embodiments, the foregoing ranges and inequality may advantageously help to transfer heat and pressure from a flat (i.e. non-patterned) thermode tool to the plurality of bond pads 434 simultaneously, for example during ACF bonding (and to help facilitate ACF bonding). In certain embodiments, a flat (i.e. non-patterned) thermode tool may simplify and quicken the ACF bonding of the flexure tail bond pads 434, by reducing the need for precise alignment of the thermode tool during use.

Certain embodiments described herein may provide the foregoing advantages without a need for the structural layer 410 of the flexure tail terminal region 400 to have discontinuous islands aligned with and backing the flexure bond pads 434. For example, FIG. 4B depicts an embodiment in which the structural layer 410 is generally contiguous where the flexure tail terminal region 400 overlaps the FPC 260 (shown in FIG. 3). In this context, the structural layer 410 can be considered to be generally contiguous in a region, though it may have some holes, slots, or vias in such region, so long as there are no discontinuous islands in the structural layer 410 having an areal size similar to that of a flexure bond pad 434. Accordingly in the embodiment of FIG. 4B, the flexure tail terminal region 400 may have improved peel strength along the length 474 that overlaps the FPC 260, and be less likely to tear in the event that rework of the flexure tail bonding process becomes necessary.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A head suspension assembly for a disk drive, the head suspension assembly comprising:
    a load beam; and
    a flexure attached to the load beam, the flexure comprising:
        a structural layer,
        a conductive layer,
        a dielectric layer between the structural layer and the conductive layer, and an insulative cover layer disposed on the conductive layer;
wherein the flexure further includes a tongue portion with a head mounting surface, and a flexure tail that extends away from the tongue portion to a terminal region;
wherein the conductive layer includes:
  a plurality of electrically conductive traces; and
  a plurality of flexure bond pads in the terminal region of the flexure tail, each of the plurality of flexure bond pads comprising a widened region of a corresponding one of the plurality of electrically conductive traces;
wherein the insulative cover layer defines a cover layer thickness, and the insulative cover layer includes a plurality of openings that expose each of the plurality of flexure bond pads in the terminal region of the flexure tail;
wherein the dielectric layer defines a first thickness between the structural layer and the conductive layer at each of the plurality of flexure bond pads, and the dielectric layer defines a second thickness between the structural layer and the conductive layer adjacent to the plurality of flexure bond pads in the terminal region of the flexure tail and recessed from the conductive layer; and
wherein the second thickness is less than the first thickness by a thickness difference that is no less than the cover layer thickness.

2. The head suspension assembly of claim 1 wherein the structural layer comprises stainless steel, the dielectric layer comprises polyimide, and the conductive layer comprises copper.

3. The head suspension assembly of claim 1 wherein the thickness difference is in the range of 4 microns to 8 microns.

4. The head suspension assembly of claim 1 wherein the first thickness is in the range of 7 microns to 11 microns.

5. The head suspension assembly of claim 1 wherein the first thickness is approximately twice the second thickness.

6. The head suspension assembly of claim 1 wherein the insulative cover layer further comprises an electrically insulative polymeric material and the cover layer thickness is in the range of 3 microns to 5 microns.

7. The head suspension assembly of claim 1 wherein a total thickness of the terminal region of the flexure tail is greater at each of the plurality of flexure bond pads than adjacent to the plurality of flexure bond pads.

8. The head suspension assembly of claim 1 wherein the terminal region of the flexure tail defines a flexure tail longitudinal axis, and wherein each of the plurality of flexure bond pads extends further parallel to the flexure tail longitudinal axis than it extends transverse to the flexure tail longitudinal axis.

9. The head suspension assembly of claim 1 wherein the load beam comprises stainless steel having a thickness greater than that of the structural layer of the flexure.

10. A head gimbal assembly (HGA) for a disk drive, the HGA comprising:
a head; and
a head suspension assembly comprising:
  a load beam; and
  a flexure attached to the load beam, the flexure comprising:
    a structural layer,
    a conductive layer,
    a dielectric layer between the structural layer and the conductive layer, and
    an insulative cover layer disposed on the conductive layer;
wherein the flexure further includes a tongue portion to which the head is attached, and a flexure tail that extends away from the tongue portion to a terminal region;
wherein the conductive layer includes:
  a plurality of electrically conductive traces; and
  a plurality of flexure bond pads in the terminal region of the flexure tail, each of the plurality of flexure bond pads comprising a widened region of a corresponding one of the plurality of electrically conductive traces;
wherein the insulative cover layer defines a cover layer thickness, and the insulative cover layer includes a plurality of openings that expose each of the plurality of flexure bond pads in the terminal region of the flexure tail;
wherein the dielectric layer defines a first thickness between the structural layer and the conductive layer at each of the plurality of flexure bond pads, and the dielectric layer defines a second thickness between the structural layer and the conductive layer adjacent to the plurality of flexure bond pads in the terminal region of the flexure tail and recessed from the conductive layer; and
wherein the second thickness is less than the first thickness by a thickness difference that is no less than the cover layer thickness.

11. The HGA of claim 10 wherein the thickness difference is in the range of 4 microns to 8 microns.

12. The HGA of claim 10 wherein the first thickness is in the range of 7 microns to 11 microns.

13. The HGA claim 10 wherein the cover layer thickness is in the range of 3 microns to 5 microns.

14. The HGA claim 10 wherein a total thickness of the terminal region of the flexure tail is greater at each of the plurality of flexure bond pads than adjacent to the plurality of flexure bond pads.

15. A disk drive comprising:
a disk drive base;
an actuator assembly that is pivotably mounted on the disk drive base, the actuator assembly including:
an actuator body;
an arm extending from the actuator body;
a flexible printed circuit (FPC) adjacent to the actuator body and having a plurality of electrically conductive FPC bond pads; and
a head gimbal assembly (HGA) attached to the arm of the actuator, the HGA comprising:
  a head; and
  a head suspension assembly comprising:
    a load beam; and
    a flexure attached to the load beam, the flexure comprising a structural layer, a conductive layer, a dielectric layer between the structural layer and the conductive layer, and an insulative cover layer disposed on the conductive layer;
  wherein the flexure further includes a tongue portion to which the head is attached, and a flexure tail that extends away from the tongue portion to a terminal region that overlaps the plurality of electrically conductive FPC bond pads;
  wherein the conductive layer includes:
    a plurality of electrically conductive traces; and
    a plurality of flexure bond pads in the terminal region of the flexure tail, each of the plurality of flexure bond pads comprising a widened region of a corresponding one of the plurality of electrically conductive traces;

wherein the insulative cover layer defines a cover layer thickness, and the insulative cover layer includes a plurality of openings that expose each of the plurality of flexure bond pads in the terminal region of the flexure tail;

wherein the dielectric layer defines a first thickness between the structural layer and the conductive layer at each of the plurality of flexure bond pads, and the dielectric layer defines a second thickness between the structural layer and the conductive layer adjacent to the plurality of flexure bond pads in the terminal region of the flexure tail and recessed from the conductive layer; and wherein the second thickness is less than the first thickness by a thickness difference that is no less than the cover layer thickness.

16. The disk drive of claim 15 wherein the thickness difference is in the range of 4 microns to 8 microns.

17. The disk drive of claim 15 wherein the first thickness is approximately twice the second thickness.

18. The disk drive of claim 15 wherein the cover layer thickness is in the range of 3 microns to 5 microns.

19. The disk drive of claim 15 wherein a total thickness of the terminal region of the flexure tail is greater at each of the plurality of flexure bond pads than adjacent to the plurality of flexure bond pads.

20. The disk drive of claim 19 wherein each of the flexure bond pads is bonded to a corresponding one of the plurality of FPC bond pads by an anisotropic conductive film.

* * * * *